US008281724B2

(12) United States Patent
Snipes

(10) Patent No.: US 8,281,724 B2
(45) Date of Patent: *Oct. 9, 2012

(54) VOLUMETRIC METERING SYSTEM WITH SECTIONAL SHUT-OFF

(75) Inventor: Terry L. Snipes, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/604,708

(22) Filed: Oct. 23, 2009

(65) Prior Publication Data

US 2010/0307395 A1 Dec. 9, 2010

Related U.S. Application Data

(63) Continuation-in-part of application No. 12/481,254, filed on Jun. 9, 2009.

(51) Int. Cl.
*A01C 7/00* (2006.01)
*A01C 9/00* (2006.01)
(52) U.S. Cl. ....................... 111/182; 111/178
(58) Field of Classification Search .......... 111/177–182, 111/170, 200, 900; 342/357.07
See application file for complete search history.

(56) References Cited

U.S. PATENT DOCUMENTS

| 4,023,707 | A | 5/1977 | Johnson |
| 5,845,818 | A | 12/1998 | Gregor et al. |
| 5,878,679 | A | 3/1999 | Gregor et al. |
| 2009/0078178 | A1 | 3/2009 | Beaujot |
| 2009/0079624 | A1 | 3/2009 | Dean et al. |

FOREIGN PATENT DOCUMENTS

| AT | 383720 | 8/1987 |
| CA | 2311698 A1 * | 12/2001 |
| DE | 4411000 | 3/1995 |
| GB | 2056237 | 3/1981 |

OTHER PUBLICATIONS

European Search Report received Aug. 3, 2011 (6 pages).

* cited by examiner

*Primary Examiner* — Christopher J. Novosad

(57) ABSTRACT

A volumetric metering system for a seeding machine is provided with a plurality of movable inserts each insert defining a ledge over which the seed falls to the meter outlet. The inserts are selectively movable between an open position in which seed is allowed to flow over the ledge and a closed position in which the inserts close the product flow to the outlet. By locating the product shut-off after the meter but before product enters the distribution system, there will only be a short delay in stoppage of product flow once the shut-off is closed.

6 Claims, 3 Drawing Sheets

VOLUMETRIC METERING SYSTEM WITH SECTIONAL SHUT-OFF

CROSS-REFERENCE TO RELATED APPLICATION

This application is a continuation-in-part of U.S. application Ser. No. 12/481,254, filed 9 Jun. 2009.

FIELD OF THE INVENTION

The present invention relates to a volumetric seed meter and in particular to such a seed meter having sectional meter shut-off.

BACKGROUND OF THE INVENTION

Volumetric meters are commonly used in agricultural seeding implements such as grain drills and air seeders to meter the seed. Volumetric meters are also used with fertilizer or other chemical applicators. A volumetric meter often employs a meter roller contained within a housing that defines an inlet for receiving product from a tank and an outlet for dispensing metered product. The meter roller is fluted so that as the roller is rotated, product from the tank is carried to the outlet in a controlled manner based on the size of the roller flutes and speed of rotation of the roller. From the meter housing, the seed is carried by a distribution system for dispensing to the soil. The distribution system typically includes a number of individual channels each receiving seed from a defined section of the meter roller. The distribution system may be a gravity system that guides the seed as it falls by gravity from the meter to the soil. Alternatively, the distribution system may be pneumatic, using flowing air to distribute the seed from the meter. A pneumatic distribution system typically has a plurality of primary distribution lines, each supplied with product from a defined section of the meter roller. Typically, product flowing through each primary distribution line is later divided into several secondary distribution lines, each directed to an individual crop row in the soil.

In contrast to a volumetric seed meter, row crop planters use individual seed meters located at each row unit. These meters are supplied by either individual seed hoppers mounted to the row unit or supplied with seed from a central tank, often with a pneumatic system to deliver the seed. The seed meters, however, instead of metering the seed based on volume, singulate the seed and deliver one or more seeds upon specified intervals. Recent products have been made available on row crop planters that shut-off the flow of seed at the individual row units. This is often accomplished by a clutch mechanism in the seed meter drive that is actuated to disengage the seed meter drive. These have met with commercial success as customers seek to control costs by eliminating any double seeding such as can occur at the edge of a field when the area remaining to be seeded is not as wide as the planter or in a non-rectangular field where the rows do not all end at the same location. Since the seed shut-off is at the individual meter mounted on the row, there is only a short delay or no delay from the time the meter is shut-off until the flow of seed at the soil is stopped.

To provide a similar shut-off on a volumetric meter having an air, i.e. pneumatic, distribution system, a number of unique challenges must be overcome that do not exist with a row crop planter. These challenges include: 1) if seed is stopped from flowing into the meter, there is a long delay until seed stops flowing at the discharge since the meter housing must empty before seed flow stops; 2) air seeders may mix multiple products within the airstream so that stopping the flow of seed to the ground by redirecting the air flow after the seed is introduced into the airstream requires separation of the mixed products; and 3) with some air seeders, the product tanks are pressurized during operation, further complicating the return of redirected product to the tank.

One approach to providing a sectional meter shut-off is shown in US patent application publication number 2009/0079624, published Mar. 26, 2009. Slidable gates are positioned between the product storage tank and the meter roller. Individual actuators are provided to move each gate between open and closed positions. Because the gates are positioned between the storage tank and the meter, after actuation of the shut-off actuators, product will continue to flow until the meter is emptied of product. Thus this arrangement does nothing to address the first challenge listed above.

SUMMARY OF THE INVENTION

The present invention utilizes the existing wear insert in the meter housing as a movable gate to shut-off the flow of product from the meter. The insert forms a ledge over which metered product flows to the meter housing outlet. Using the insert as the shut-off gate avoids the addition of a separate component to function as the gate. By placing the gate after the meter but before the distribution system, product flow will stop more quickly after shut-off then with the device shown in the above patent application as the meter housing does not first have to empty itself of product. Furthermore, by locating the gate before the distribution system, metered product is not mixed with the air stream or with additional products, causing a need for product redirection into a pressurized tank or separation of multiple products.

DESCRIPTION OF THE PREFERRED EMBODIMENT

Figure 1:
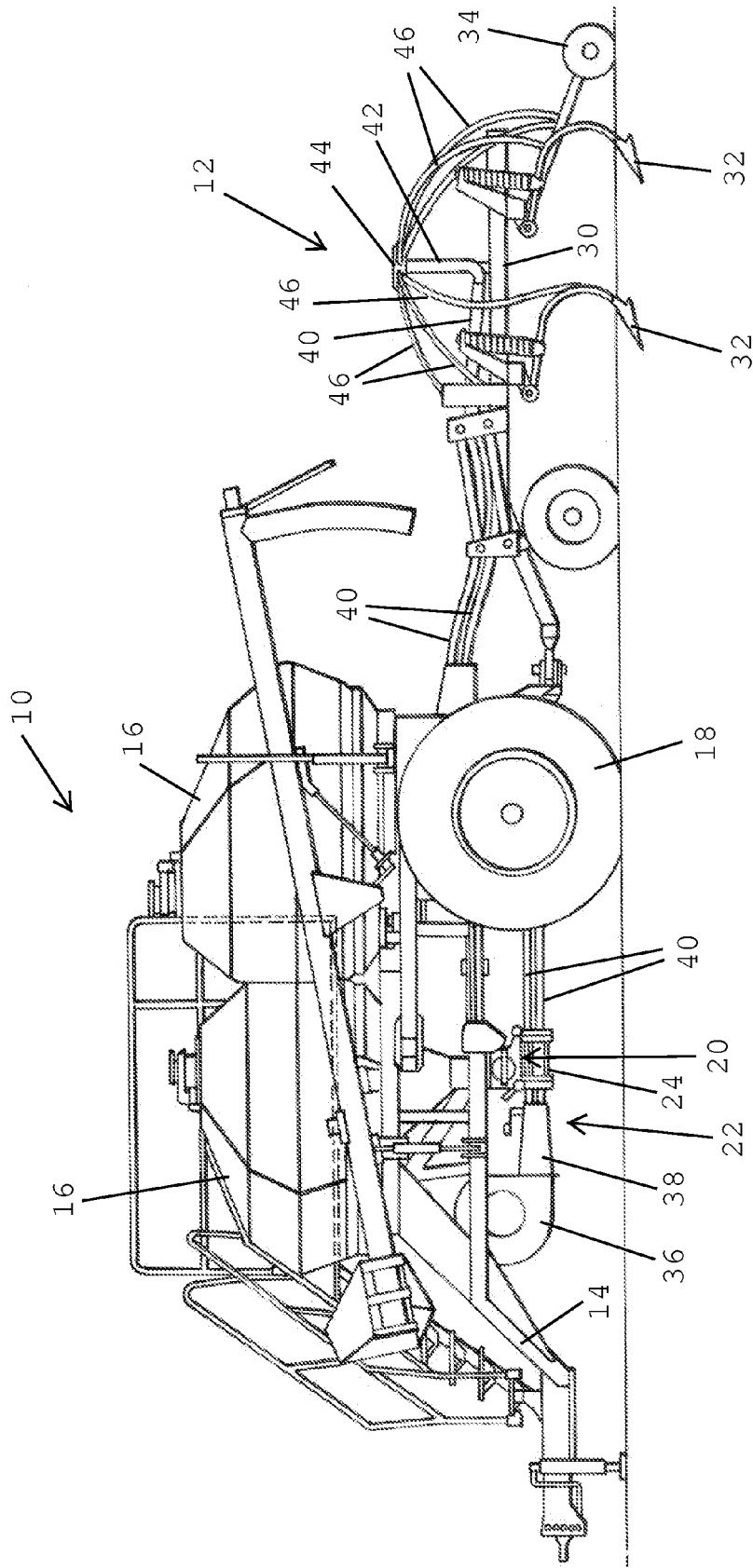
FIG. 1 is a side elevational view of an air seeder and tiling implement having the sectional meter shut-off of the present invention.

An air seeder constructed according to a preferred embodiment of the present invention is shown in the figures. With reference to FIG. 1, an air seeder is shown comprising of a seed cart 10 towed between a tractor (not shown) and a tilling implement 12. The seed cart 10 has a frame 14 to which product tanks 16 and wheels 18 are mounted. Each product tank 16 has an associated metering system 20 at its lower end (only one of which is shown) for controlled feeding of product into a pneumatic distribution system 22 at a primary distribution manifold 24. The tilling implement 12, towed behind the seed cart 10, consists generally of a frame 30 to which ground openers 32 are mounted. Incorporation of seed row finishing equipment such as closing wheels 34 is also desirable in many applications.

The pneumatic distribution system 22 includes a centrifugal fan 36 connected to a plenum 38, which is in turn connected to one or more primary distribution manifolds 24, each associated with a product tank 16. The individual passages in the primary distribution manifold 24 are each connected by a primary distribution line 40 to a riser tube 42, only one of which is shown. Each riser tube 42 is in turn coupled to a secondary distribution header 44. Secondary distribution lines 46 connect the secondary distribution header 44 to seed boots mounted on the ground openers 32 to deliver product, seed or fertilizer, etc. to the furrow formed by the openers 32. While the air seeder of FIG. 1 is shown as a separate air cart connected to a tilling implement, the product tanks 16, metering system 20 and distribution system 22 can be mounted to the same frame as the ground openers 32.

The metering system 20 will now be described in greater detail with reference to FIGS. 2-5. Metering system 20 includes a housing 50 that forms a product inlet 52 coupled to a product tank 16 to receive product, such as seed, from the tank. The housing 50 further forms an outlet 54 through which metered seed falls to the primary manifold 24 of the pneumatic distribution system.

A meter roller 72 is disposed in the housing 50. The meter roller 72 is constructed of a plurality of roller segments 78 axially positioned along a drive shaft 80. In the embodiment shown, the drive shaft 80 is hex shaped to mate with the hex shaped bore in the roller segments 78. The meter roller and a bottom wall 56 of the housing define a passage 58 there between. As the meter roller 72 rotates as shown by the arrow 74, product is moved from the inlet 52, through the passage 58, to the outlet 54. Inserts 82 are provided in the housing on the bottom wall 56 in the product passage and further defining the product passage 58. Product flows over the insert in the passage 58. The distal end of the insert forms a ledge 84 over which product moves to the outlet 54. The ledge can wear overtime from the product flowing over the ledge. Thus, the inserts are intended to be replaceable. Preferably there is one insert for each primary distribution line but more or fewer inserts can be provided. The inserts 82 are movably mounted in the housing 50 for linear movement between the open position shown in FIG. 2 and a closed position shown in FIG. 3. Each insert includes an extension 86 that extends through a slot in the housing 50 to the exterior of the housing. Actuators 88 are mounted to the housing 50 and have extendable rods 90 coupled to each insert 82. Preferably one actuator is provided for each insert, but fewer actuators can be used with each actuator controlling more than one insert. The actuator may be hydraulic, pneumatic, electric etc. In the normal operating position, the rod 90 is retracted and the insert is in the open position, allowing seed to flow over the ledge 84. When actuated, the rod 90 is extended and moves the insert to the closed position in which the ledge 84 bears against the inner surface of the housing on the opposite side of the outlet 52. This closes the outlet and prevents seed from flowing from the housing into the associated primary distribution line or lines.

Figure 2:
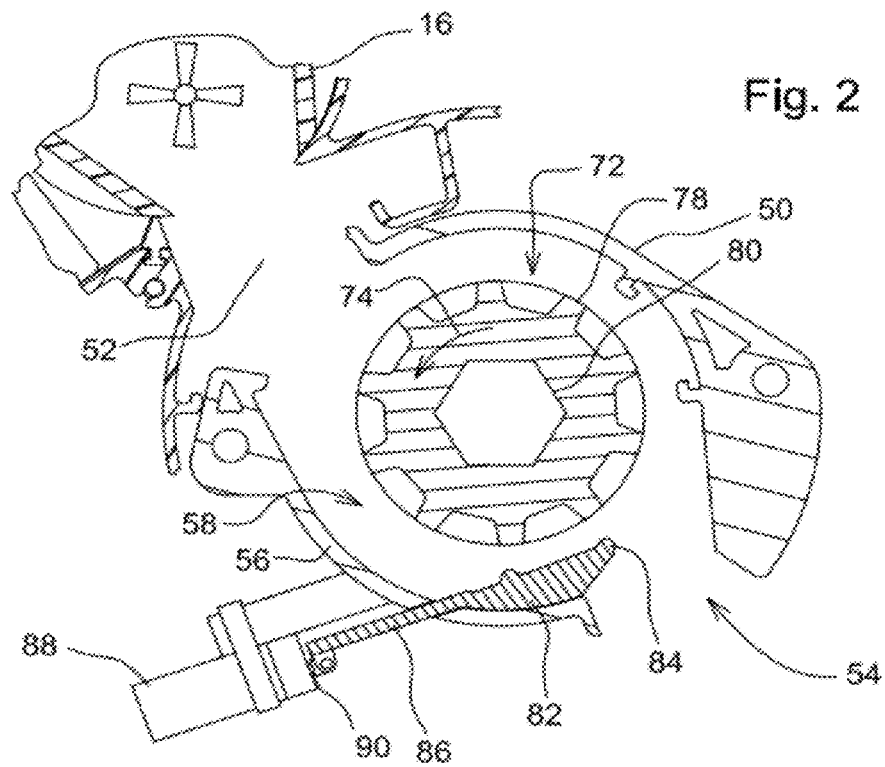
FIG. 2 is a side sectional view of the seed meter of the air seeder shown in FIG. 1 with the insert in the open position.
Figure 3:
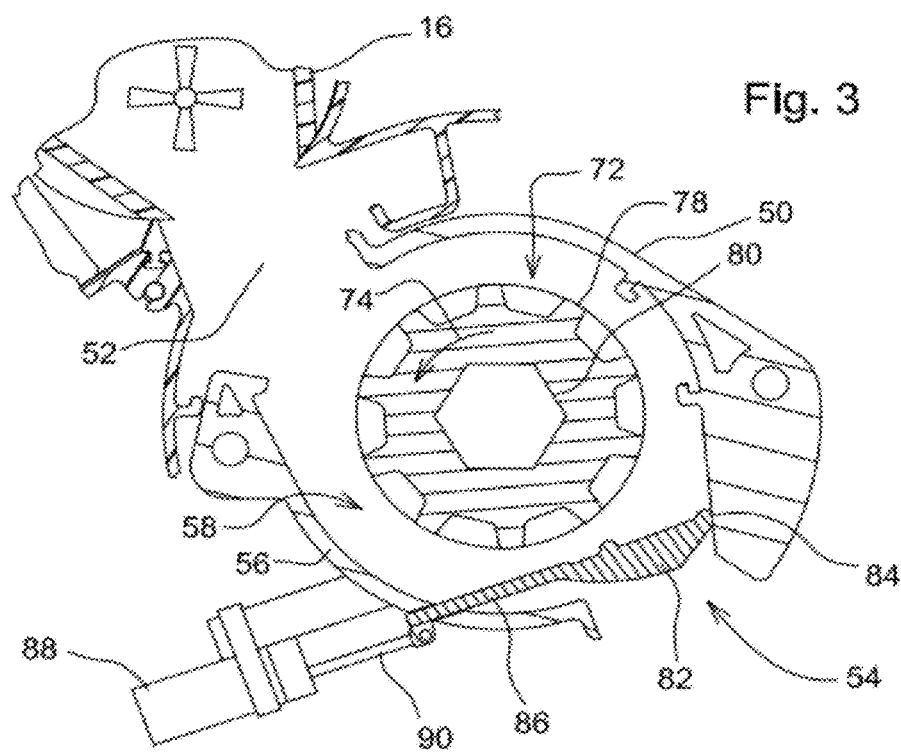
FIG. 3 is a side sectional view of the seed meter shown in FIG. 2 with the insert in the closed position.
Figure 4:
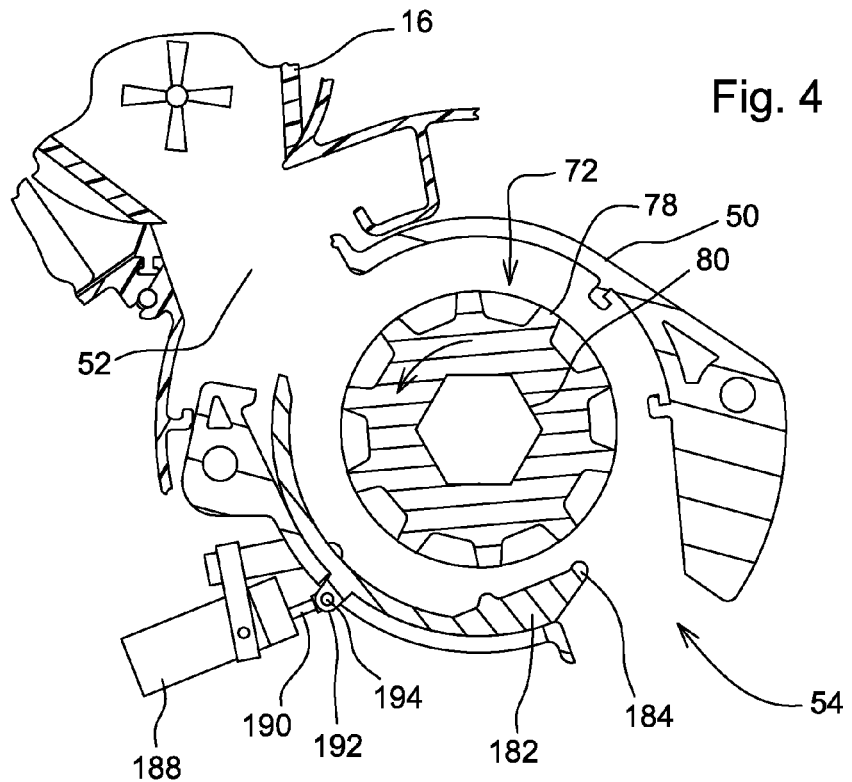
FIG. 4 is a side sectional view of another embodiment of the seed meter with the insert in the open position.
Figure 5:
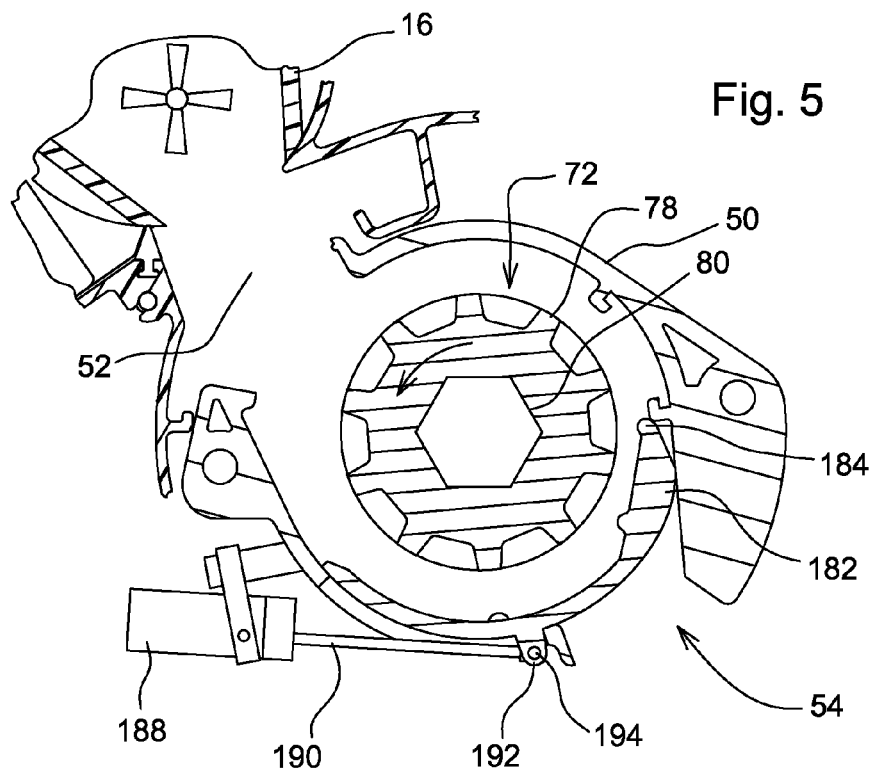
FIG. 5 is a side sectional view of the seed meter shown in FIG. 4 with the insert in the closed position.

An alternative embodiment is shown in FIGS. 4 and 5 where like components are given the same numerals as in FIGS. 2 and 3 while modified components are given the same numeral with the addition of 100. The insert 182 slides along a curved path between the open and close positions rather than a straight path as shown in FIGS. 2 and 3. This provides a rotary motion generally about the axis of the shaft 80. The insert has a mounting boss 192 that extends through the housing wall. The actuator 188 as an extendable rod 190 that is coupled to the mounting boss 192 by a pivot pin 194. The actuator 180 is also pivotally mounted to allow the insert 182 to travel in a curved path while the rod 190 extends in a straight line.

Preferably the actuator rod is spring biased to the retracted position so that the rod remains retracted when the actuator is in the non-energized state. The terms energized and non-energized mean when the actuating power is present or not present and can be electric, pneumatic, hydraulic, etc. The actuators are preferably electronically controlled. The actuators can be controlled selectively by the operator through a control panel in the tractor cab or, preferably, the actuators are controlled by field mapping software in combination with a vehicle positioning system such as GPS. With the use of field maps and vehicle positioning, the actuators will be activated to close product flow from the meter, and thus stop product flow to one or more of the distribution lines 40 which supply product to one or more rows of the tilling implement 12, as the tilling implement covers area which has already been seeded, which will be seeded in a later pass, or which should not be seeded at all.

The present invention uses the already existing insert as the shut-off gate. This avoids the need for a separate member to function as the gate. The shut-off for a volumetric meter of the present invention, located after the meter roller but before product has moved into the air stream, overcomes the challenges described above. The long delay between shut-off and the termination of product discharge at the row is reduced since the meter does not need to empty before product flow ceases. Since the product is stopped before the product enters the air stream, diversion of the product back to the tank is not needed. This avoids the need to separate mixed products and avoids the difficulty of returning product to a pressurized tank. While the invention has been shown and described in the context of an air seeder, it will be appreciated by those skilled in the art that the invention can be used with any volumetric meter such as a grain drill that uses gravity to distribute seed from the meter to the ground.

Having described the preferred embodiment, it will become apparent that various modifications can be made without departing from the scope of the invention as defined in the accompanying claims.

The invention claimed is:

1. A volumetric metering system for metering a product in a seeding machine having a product tank and a distribution system for distributing the metered product having a product distribution line, said metering system comprising:
   a meter roller having a roller segment along a roller axis for metering product from the tank to the distribution system;
   a meter housing generally surrounding the meter roller and defining an inlet and an outlet for metered product to flow through;
   the meter roller and a bottom wall of the housing defining a product passage through which product flows from the inlet to the outlet;
   an insert disposed in the product passage over which product flows, the insert having a distal end forming a ledge below the meter roller over which metered product flows to the outlet, the insert being movably mounted in the housing to move between an open position in which product is allowed to flow over the ledge and a closed position in which the insert extends across the outlet to block flow of product; and
   an actuator arranged to selectively move the insert from the open position to the closed position.

2. The metering system of claim 1 wherein the insert moves along a linear path between the open and closed position.

3. The metering system of claim 2 wherein a portion of the insert extends outward of the housing.

4. The metering system of claim 1 wherein the insert moves along a curved path between the open and closed position.

5. The metering system of claim 4 wherein the insert includes a mounting boss that extends outward of the housing.

6. The metering system of claim 1 wherein the actuator has a non-energized state and an energized state, when in the energized state, the actuator moves the insert to the closed position.

* * * * *